(12) United States Patent
Yoshie et al.

(10) Patent No.: US 11,571,841 B2
(45) Date of Patent: Feb. 7, 2023

(54) PLASTIC MOLDED PRODUCT

(71) Applicant: YKK Corporation, Tokyo (JP)

(72) Inventors: Kenichi Yoshie, Kurobe (JP); Ming Yi Huang, Taiwan (TW); Makoto Ueda, Taipei (TW)

(73) Assignee: YKK Corporation, Tokyo (JP)

( * ) Notice: Subject to any disclaimer, the term of this patent is extended or adjusted under 35 U.S.C. 154(b) by 575 days.

(21) Appl. No.: 16/611,845

(22) PCT Filed: May 8, 2017

(86) PCT No.: PCT/JP2017/017382
§ 371 (c)(1),
(2) Date: Nov. 7, 2019

(87) PCT Pub. No.: WO2018/207233
PCT Pub. Date: Nov. 15, 2018

(65) Prior Publication Data
US 2020/0164549 A1    May 28, 2020

(51) Int. Cl.
*B29C 37/00* (2006.01)
*B29C 45/26* (2006.01)
*B29L 31/00* (2006.01)

(52) U.S. Cl.
CPC ........ *B29C 37/0053* (2013.01); *B29C 45/263* (2013.01); *B29K 2995/0024* (2013.01); *B29L 2031/727* (2013.01)

(58) Field of Classification Search
CPC ........ B29C 37/0053; B29K 2995/0024; B29L 2031/727
See application file for complete search history.

(56) References Cited

U.S. PATENT DOCUMENTS 5,243,740 A  *  9/1993  Wakabayashi ......... A44B 11/02
24/191
5,544,394 A     8/1996  Yaguramaki
(Continued)

FOREIGN PATENT DOCUMENTS

CN    1104080 A    6/1995
CN    3036008      10/1995
(Continued)

OTHER PUBLICATIONS

JP2003245106 machine translation (Year: 2003).*
(Continued)

*Primary Examiner* — Timothy Kennedy
*Assistant Examiner* — Alexander A Wang
(74) *Attorney, Agent, or Firm* — Kilpatrick Townsend & Stockton LLP

(57) ABSTRACT

A plastic molded product includes a plastic body provided with a plurality of holes, which are recessed in a common depth direction, on a surface of the plastic body. The holes include: an inner surface including an inlet a specific reference plane perpendicular to the depth direction and including at least a portion of the inlet and a depth reference point, which is spaced away from a center point on an inlet side of the specific reference plane toward a bottom side of the hole, the depth reference point being spaced away by a distance equal to ¼ of a maximum value of an inlet side bore diameter on the specific reference plane. A deepmost portion of the inner surface of the hole is in a position which coincides with the reference point or is deeper than the reference point toward the bottom side.

7 Claims, 9 Drawing Sheets

(56) References Cited

U.S. PATENT DOCUMENTS

| | | |
|---|---|---|
| 5,705,254 A | 1/1998 | Morinaga et al. |
| 6,317,940 B1 | 11/2001 | Matoba et al. |
| D667,753 S | 9/2012 | Nanbu et al. |
| D667,754 S | 9/2012 | Takahashi |
| 2005/0087521 A1 | 4/2005 | Yang |
| 2014/0087130 A1 | 3/2014 | Seyler et al. |
| 2015/0013121 A1 | 1/2015 | Kaneko |
| 2016/0084282 A1 | 3/2016 | Kaneko et al. |
| 2016/0084292 A1 | 3/2016 | Kaneko et al. |

FOREIGN PATENT DOCUMENTS

| | | |
|---|---|---|
| CN | 1273067 A | 11/2000 |
| CN | 102014683 A | 4/2011 |
| CN | 301783414 S | 1/2012 |
| CN | 103859712 A | 6/2014 |
| CN | 104125786 A | 10/2014 |
| CN | 105188454 A | 1/2015 |
| CN | 204120454 U | 1/2015 |
| CN | 104717947 A | 6/2015 |
| CN | 104883919 A | 9/2015 |
| EP | 0990926 A2 | 4/2000 |
| JP | H08-090586 A | 4/1996 |
| JP | 2000-167925 | 6/2000 |
| JP | 2003245106 * | 9/2003 |
| JP | 2006-068972 A | 3/2006 |
| JP | 4489556 B2 | 4/2010 |

OTHER PUBLICATIONS

Office Action, Chinese Patent Application No. 201780090539.2, dated Sep. 18, 2021, 33 pages.
Office Action, Chinese Patent Application No. 201780090539.2, dated Jan. 25, 2021, 18 pages.
International Search Report, PCT Patent Application No. PCT/JP2017/017382, dated Jun. 27, 2017.
Written Opinion, PCT Patent Application No. PCT/JP2017/017382, dated Jun. 27, 2017.
International Preliminary Report on Patentability, PCT Patent Application No. PCT/JP2017/017382, dated Nov. 12, 2019.

* cited by examiner (a)

(b)

(c)

(d)

(e)

(f)

(a)

(b)

(a)

(b)

(c)

PLASTIC MOLDED PRODUCT

TECHNICAL FIELD

The present invention relates to a plastic molded product having small specular glossiness, that is, a so-called matte plastic molded product.

BACKGROUND ART

Plastic molded products have different specular glossiness. Among plastic molded products in related art, as an example of a plastic molded product having small specular glossiness, there is a plastic molded product using a mold which is subjected to wrinkling processing. The wrinkling processing refers to processing in which a surface of the mold is not mirror finished, fine irregularities are formed on the surface, and a pattern thereof is transferred to a molded product.

Generally, electric discharge processing and sandblast processing are known as examples of the wrinkling processing in the related art. When the plastic molded product is molded by the mold which is subjected to the electric discharge processing or the sandblast processing, an entire surface of the plastic molded product becomes rough.

As another example of the wrinkling processing, laser processing that forms small holes having conical shapes, more specifically, small holes in which diameters of circles gradually decrease toward bottoms, on a surface of a mold is known (Patent Literature 1). When molding is performed using the mold subjected to such laser processing, a large number of fine conical protrusions are formed on a surface of a plastic molded product.

CITATION LIST

Patent Literature

[Patent Literature 1] Japanese Patent No. 4489556

SUMMARY OF INVENTION

Technical Problem

However, it is considered that the electric discharge processing or the sandblast processing during the wrinkling processing should roughen a surface of a mold finely, or simply form concave and convex portions on the surface of the mold, and the concave and convex portions formed on the surface of the mold are shallow. Therefore, concave portions of the plastic molded product formed by such a mold are shallow. When light reaches the plastic molded product, the light reaches bottoms of the concave portions, and is specularly reflected out of a hole, so that specular glossiness of the plastic molded product is reduced to some extent. When expressed by specific numerical values, for example, as for a plastic molded product produced by the present applicant at May, 2017, maximum roughness Rmax thereof is 12.5 μm, arithmetic average roughness Ra thereof is 3.15 μm, and specular glossiness thereof is 5.5 to 6.4. A measuring instrument sold by Horiba, ltd (trade name: high-gloss gloss checker IG-410) was used. A measuring method of the specular glossiness of the measuring instrument is in accordance with a measuring method of Japanese Industrial Standards Z8741. Measurement results of specular glossiness are described throughout this description, the specular glossiness is measured using the above-described measuring instrument.

In a case where a large number of conical protrusions are formed on a surface of a plastic molded product, since light is diffusely reflected by the protrusions, specular glossiness of the plastic molded product is likely to be lower than that of a plastic molded product made by the electric discharge processing or the sandblast processing. However, tip portions of conical shapes are easily broken by external impact, and are easily scraped by friction. That is, durability thereof is poor.

The present invention is made in view of the above circumstances, and an object of the present invention is to provide a plastic molded product having small specular glossiness, whose durability is improved as much as possible.

Details of the measuring method of Japanese Industrial Standards Z8741 are as follows.

Specular reflection refers to light reflection that conforms to a law of reflection like reflection on a mirror surface.

Specular reflectance refers to a ratio of a reflected radiation beam (or a reflected light beam) to an incident radiation beam (or an incident light beam) in the specular reflection.

Specular gloss refers to an attribute of visual perception mainly determined by intensity of specularly reflected light.

Specular glossiness refers to a numerical value obtained by measuring a degree of the specular gloss.

A light receiving angle refers to an angle formed by an optical axis of a light receiving system and a normal line of a sample surface.

The sample surface refers a surface of a sample and is a plane.

As for an instrument for measuring the specular glossiness, a concept is shown in FIG. 10, in which a light beam having a prescribed opening angle is incident at an incident angle defined on the sample surface from a light source S0, and the light beam having the prescribed opening angle, which is reflected in a specular reflection direction, is measured by a light receiver R0.

An opening S1 of the light source is located at a focal position of a lens L2. When a mirror surface is placed on the sample surface, an image of S1 generates a clear image in a center of an opening S2 of the light receiver. An incident angle θ is an angle formed by a line connecting a center of the opening S1 and a center of the lens L2 (principal point of the lens) and a normal line of a sample T.

Opening angles $\alpha_1$, $\alpha_2$ are angles formed by extending the openings S1, S2 to positions of lenses L2, L3, and an opening angle $\alpha_1'$ is an angle formed by extending an image S1' of the opening S1 to a position of the lens L3. Optical axes on an incident side and a light receiving side intersect at the sample surface. However, at a position of the opening S1, a light source filament may be used instead of the opening S1.

Specific numerical values are as follows. Incident angle $\theta=60\pm0.2$ degrees. Light-receiving angle $\theta'=\theta\pm0.1$ degrees. The opening angle of the light source image in an incident surface $(\alpha_1')=0.75\pm0.10$ degrees, and an opening angle of the light source image in a perpendicular surface $(\beta_1')=2.5\pm0.1$ degrees. An opening angle of the light receiving angle in the incident surface $(\alpha_2)=4.4\pm0.10$ degrees, and an opening angle of the light receiving angle in the perpendicular surface $(\beta_2)=11.7\pm0.2$ degrees.

As for method for calculating specular glossiness Gs (θ), the specular glossiness Gs (θ) is calculated by the following formula.

$$Gs(\theta)=(\varphi s/\varphi os)\times 100$$

φs: Specularly reflected light beam from the sample surface. φos: Specularly reflected light beam from a standard surface.

100: Specular glossiness of the standard surface. Standard surface: A glass surface having a refractive index n=1.567.

Solution to Problem

The present inventors not only make concave and convex portions on a surface of a mold, in other words, a surface of a plastic molded product, but also focus on formation of holes on the surface and a relationship between structures of the holes and reflection of light, thus the present invention is achieved. More details are as follows.

As shown in FIG. 9, a typical example of a hole 4 is assumed. Specifically, the hole 4 has a structure in which a direction perpendicular to a plane is referred to as a depth direction, and a space formed inside the hole 4 has a cylindrical shape. In the hole 4 shown in FIG. 9(a), a depth is referred to as D, a diameter is referred to as W, and D is set to ¼ W. In the hole 4 shown in FIG. 9(b), D is set to be less than ¼ W. In the hole 4 shown in FIG. 9(c), D is set to be larger than ¼ W.

In a case where light is incident in the holes 4, at an inclination angle of 60 degrees with respect to a depth direction, from outer peripheries of inlets of the three types of holes 4, when the incident light reaches bottom surfaces of the holes 4, specularly reflected light travels symmetrically with the incident light at an inclination angle of 60 degrees with respect to the depth direction. In addition, the inclination angle includes angles of around 60 degrees. For example, the inclination angle may be 63.4 degrees, which is obtained in the embodiment in which the D is set to precisely ¼ W.

In the case of the hole shown in FIG. 9(b), the specularly reflected light exits the hole.

In the case of the hole shown in FIG. 9(c), the specularly reflected light is reflected back to the hole.

In the case of the hole shown in FIG. 9(a), the specularly reflected light is reflected exactly to a boundary of whether the reflected light exits the hole.

As a result, in the cases of the hole structures described above, if the depth is equal to or more than ¼ of the diameter, it is considerably possible to prevent the specularly reflected light from exiting the hole in this manner.

Based on this consideration, this consideration is applied to holes having various structures, thus the present invention is achieved.

A plastic molded product of the present invention includes a plastic body (1) provided with a plurality of holes, which are recessed in a common depth direction, on a surface of a plastic body. The holes include: an inner surface, which includes an inlet; a specific reference plane perpendicular to the depth direction, the specific reference plane including at least a portion of the inlet; and a depth reference point, which is spaced away from a center point on an inlet side of the specific reference plane toward a bottom side of the hole, the depth reference point being spaced away by a distance equal to ¼ of a maximum value of an inlet side bore diameter on the specific reference plane. A bottom portion which is a deepmost portion located on the bottom side (a side where the hole goes deeper) of the inner surface of the hole is in a position which coincides with the reference point or is deeper than the reference point toward the bottom side.

It is desirable that the hole is as follows concerning relationship between the hole and the specific reference plane.

The specific reference plane is a plane on which a deepmost point among points on a circumference that constitutes the inlet is located. The hole includes: all line segments connecting points of the circumference on the inlet side on the specific reference plane and the depth reference point; and a line segment collection surface defined by collecting all the line segments. A portion among the inner surface of the hole, which is located on the bottom side with respect to the specific reference plane, is in a position which coincides with the line segment collection surface or is deeper than the line segment collection surface toward the bottom side.

In order to further reduce specular glossiness, it is desirable to provide the following configuration.

That is, the portion among the inner surface of the hole, which is located on the bottom side with respect to the specific reference plane, is in a position which is deeper side than the line segment collection surface toward the bottom side.

In order to further reduce the specular glossiness, it is desirable to provide the following configuration.

That is, the maximum value of the inlet side bore diameter is equal to or less than 1.0 mm.

A shape of the inlet of the hole as viewed in the depth direction is not particularly limited, specific examples are as follows.

The shape of the inlet of the hole as viewed from the depth direction is rectangle, regular polygon, circle, or ellipse.

What type of surface is the surface of the plastic body is not particularly limited, specific examples are as follows.

A region, in which the plurality of the holes are formed on the surface of the plastic body, is a plane, and the plane is the specific reference plane.

The region, in which the plurality of the holes are formed on the surface of the plastic body, is a curved surface.

Advantageous Effects of Invention

In the plastic molded product of the present invention, since the depth reference point is set to ¼ of the maximum value of the inlet side bore diameter on the specific reference plane, and the bottom portion, which is the deepmost portion of the inner surface of the hole, coincides with the reference point or is positioned deeper on the bottom side than the reference point, if light is incident at an angle larger than 60 degrees with respect to the depth direction from outside of the hole toward a portion on a deeper side than the specific reference plane of the inner surface of the hole, most of light that comes out from the hole is in a so-called diffuse reflection state. That is, when light is incident in the hole at an angle larger than 60 degrees, most of the light is not specularly reflected, so that specular glossiness of the plastic molded product of the present invention can be reduced. Since the plastic molded product of the present invention includes the plurality of holes, at least a linear shape is formed between adjacent holes on the surface of the plastic body, when an external force such as an impact force or a friction force is applied, the external force is dispersed and received by the linear portion, thus the plastic molded product of the present invention is difficult to be broken or scraped as compared with a plastic molded product having conical protrusion tip ends, that is, a plastic molded product in which the external force is concentrated at one point. Therefore, durability of the plastic molded product of the present invention is improved.

In the plastic molded product, if the specific reference plane is the plane on which the deepmost point among the points on the circumference that constitutes the inlet is located, since the depth reference point is set to ¼ of the maximum value of the inlet side bore diameter on the specific reference plane, when the maximum value is taken, acute angles formed by a center line of two line segments, formed by connecting two end points of the inlet side bore diameter and the depth reference point, and the two line segments are both 60 degrees. Therefore, the line segment collection surface is a conical surface having an inclination angle of 60 degrees or a tapered surface having a steeper inclination angle. Since the portion among the inner surface of the hole, which is located on the bottom side with respect to the specific reference plane, is positioned on the line segment collection surface or on an deeper side than the line segment collection surface, if light is incident at an angle larger than 60 degrees with respect to the depth direction from the outside of the hole toward a portion on a deeper side than the specific reference plane of the inner surface of the hole, most of light that comes out from the hole is in the so-called diffuse reflection state. That is, when light is incident in the hole at an angle larger than 60 degrees, the light is not specularly reflected, so that the specular glossiness of the plastic molded product of the present invention can be reduced.

If the portion among the inner surface of the hole, which is located on the bottom side with respect to the specific reference plane, is positioned on the deeper side than the line segment collection surface, the specular glossiness of the plastic molded product can be further reduced.

If the maximum value of the inlet side bore diameter is set to 1.0 mm or less, presence of the holes is not conspicuous, that is, a good appearance can be achieved, and the specular glossiness of the plastic molded product can be reduced.

DESCRIPTION OF EMBODIMENTS

Figure 1:
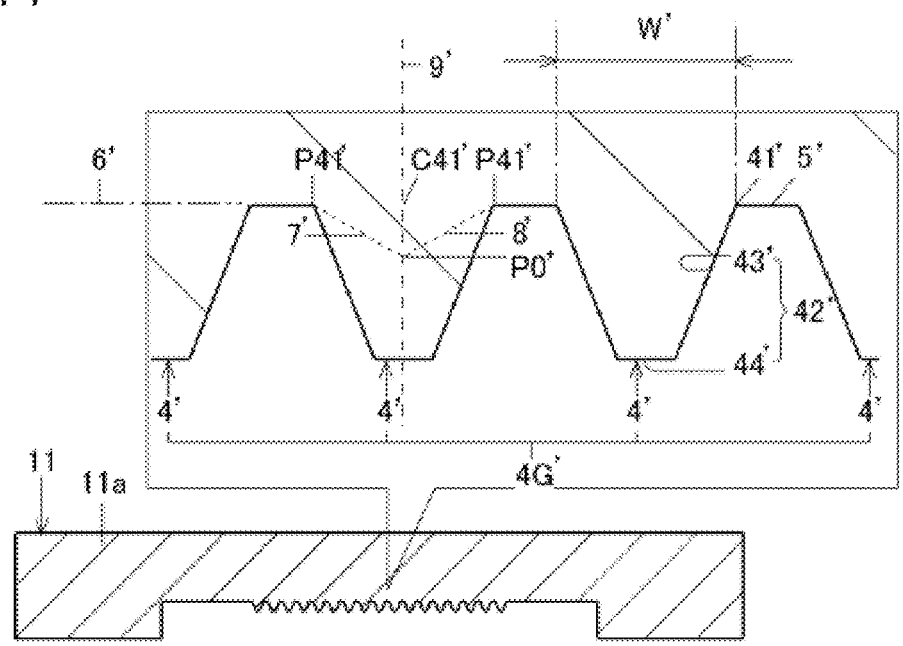
FIG. 1 is an illustrative view showing a plastic molded product and a mold thereof according to a first embodiment of the present invention.
Figure 1:
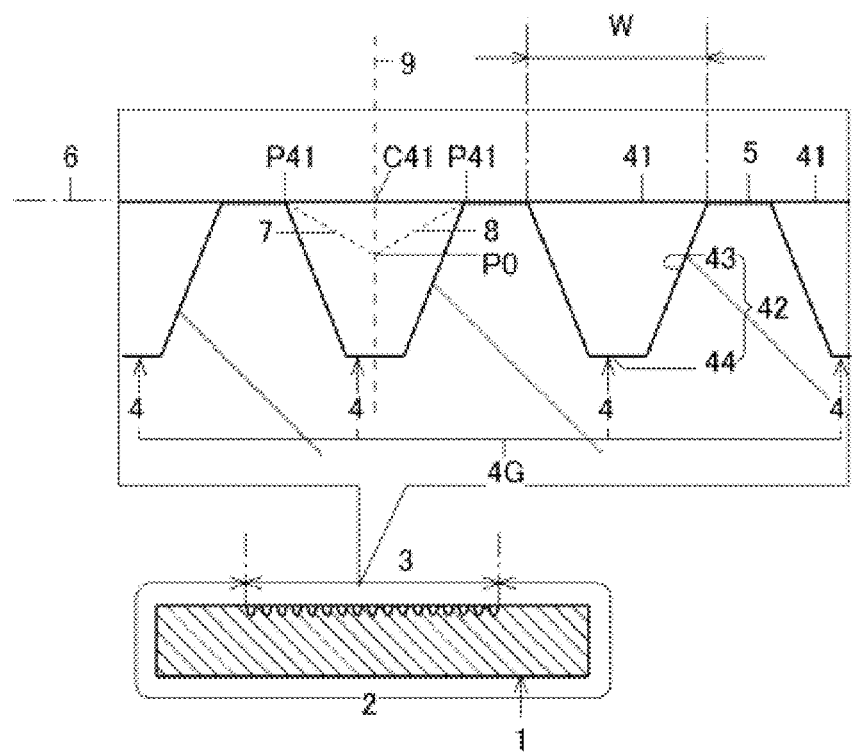
Figure 1:
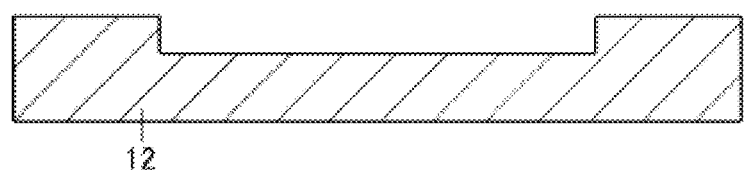
Figure 2:
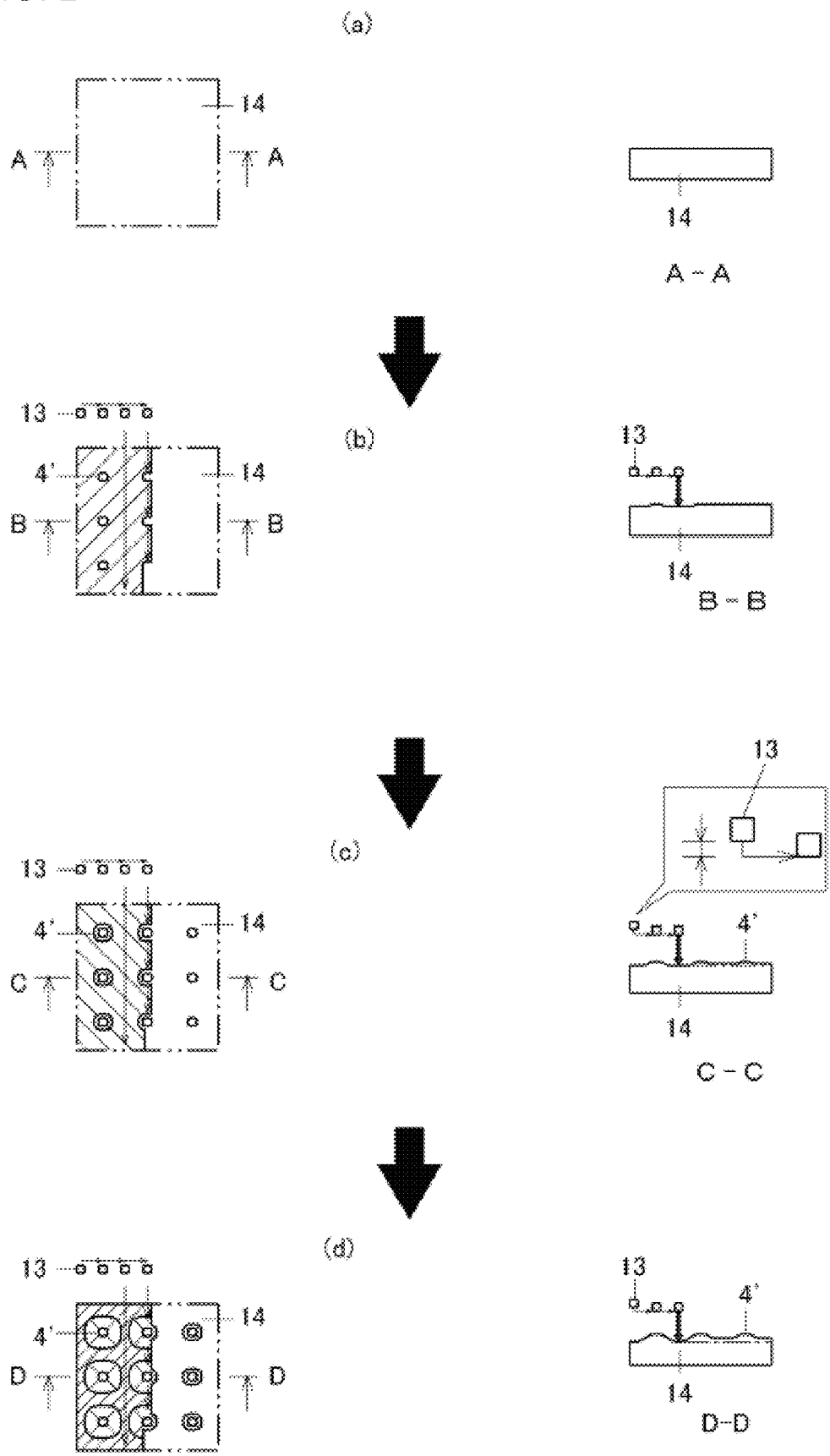
FIGS. 2(a) to 2(d) are illustrative views showing processing procedures for forming protrusions in the mold.

As shown in FIG. 1, a plastic molded product of a first embodiment of the present invention is configured by a plastic body 1. A raw material of the plastic body 1 is, for example, polyoxymethylene (POM). A region 2 having relatively large specular glossiness and a region 3 having relatively small specular glossiness are provided on a surface of the plastic body 1.

The region 2 having large specular glossiness is a portion having specular glossiness of 5.5 or more and, in the present embodiment, is a surface of the plastic body 1 in which no hole is provided.

The region 3 having small specular glossiness is a portion having specular glossiness of less than 5.5 and, in the present embodiment, includes: a hole group 4G, which is formed by a plurality of holes 4 recessed with respect to the surface of the plastic body 1; and a surface body surface 5 formed on the surface of the plastic body 1 that is, between adjacent holes 4, 4.

The surface body surface 5 is a surface in which a plurality of holes 4 are formed, in other words, a surface that connects inlets 41 of adjacent holes 4 of the hole group 4G to each other.

As for arrangement of the holes 4 of the hole group 4G, a large number of holes 4 are arranged at intervals on the surface of the plastic body 1, and in FIG. 1, the holes 4 are arranged in a line at equal intervals.

In the present embodiment, two thickness direction surfaces that constitute the surface of the plastic body 1 are parallel planes, and the hole group 4G is formed on one of the two planes (an upper surface in FIG. 1). All of the holes 4 are formed in a specific direction serving as a common depth direction. In the present embodiment, a direction perpendicular to one of the two planes is defined as the common depth direction with respect to all of the holes 4. The depth direction is an up-down direction in FIG. 1.

The hole 4 includes a specific reference plane 6 and a depth reference point P0, which serve as conceptual elements that specifies the structure.

The specific reference plane 6 is perpendicular to the depth direction, and is a plane on which deepmost points P41 among all points on a circumference that constitutes the inlet 41 are located. The specific reference plane 6 is formed for each hole 4.

The depth reference point P0 is spaced away from a center point C41 on an inlet side of the specific reference plane 6 toward a bottom side of the hole 4. The depth reference point P0 is spaced away by a distance equal to ¼ of a maximum value W of an inlet side bore diameter on the specific reference plane 6. In this case, an upper side of the hole 4 of the plastic body 1 of FIG. 1 is referred to as the inlet side while a lower side is referred to as the bottom side.

The hole 4 is annular as viewed in the depth direction, and more specifically, for example, is a rectangle, a regular polygon, a circle, or an ellipse.

The bore diameter refers to a length of a line segment (straight line) extending from one point of the annular hole 4 to another one opposite point and passing through a center point of the hole 4. For example, in a case where the hole is circular, the bore diameter is equal to a diameter, and the maximum value W of the bore diameter is also equal to the diameter. In a case where the hole is rectangular, the maximum value W of the bore diameter is equal to a diagonal length. In a case where the hole is elliptical, the maximum value W of the bore diameter is equal to a length of a major axis. In a case where the hole has a regular polygon shape while the number of corners is 5 or more, the maximum value W of the bore diameter is equal to a length of a longest line segment among line segments (straight lines) connecting vertices. In a case where the hole has a regular triangular shape, the maximum value W of the bore diameter is equal to a length of a line segment (straight line) connecting a midpoint of one side and a vertex facing the one side.

In the present embodiment, the specific reference plane 6 and the depth reference point P0 are as follows.

Since the hole 4 is formed with the direction perpendicular to the plane serving as the depth direction, points on the circumference that constitutes the inlet 41 of the hole 4 is arranged on a plane whose depth is 0, in other words, a plane having no difference in depth. In this case, the points on the circumference that constitutes the inlet 41 are the deepmost points P41 among all the points. Therefore, a plane in the region 3 having small specular glossiness is a plane where the deepest points P41 among all the points that constitutes the inlet 41 are located, and is located on the specific reference plane 6.

A circular truncated conical space is formed on an inner side of the hole 4. More specifically, an inner surface 42 of the hole 4 corresponds to the circular truncated conical space, which includes: a so-called tapered cylindrical side surface 43, in which a diameter of a circle decreases toward the bottom side in the depth direction; and a circular bottom surface 44 that closes a bottom side end of the side surface 43. Therefore, the inlet side of the hole 4 has a circular shape, and the inlet side center point C41 is a center of the circle. Since the hole 4 is formed with the direction perpendicular to the plane serving as the depth direction, an inlet side bore diameter of the specific reference plane 6 is the same as the bore diameter of the inlet 41, and the maximum value W of the inlet side bore diameter is a diameter of the circle. A point, which is spaced away by a distance of ¼ with respect to the maximum value W of the inlet side bore diameter from the inlet side center point C41, is the depth reference point P0. In the present embodiment, the bottom surface 44 is a bottom portion that is a deepmost portion of the inner surface 42 of the hole 4.

In addition to the specific reference plane 6 and the depth reference point P0, as conceptual elements that specifies the structure, the hole 4 includes: all line segments (straight lines) 7 formed by connecting the points on the circumference of the inlet side on the specific reference plane 6 and the depth reference point P0; and a line segment collection surface 8 formed by collecting all the line segments 7. As a conceptual element for facilitating understanding of the structure, the hole 4 includes a center line 9 extending in the depth direction and passing through the depth reference point P0. In the present embodiment, a portion, which is located on the bottom side with respect to the specific reference plane 6, among the inner surface 42 of the hole 4, that is, a portion located on a deeper side than the circumference of the inlet side of the hole 4, is positioned on a deeper side than the line segment collection surface 8. More details are as follows.

Since the inner surface 42 of the hole 4 corresponds to the circular truncated conical space, a center point of the inner surface 42 of the hole 4 is a center point of the bottom surface 44, and is located on the bottom side with respect to the depth reference point P0 on the center line 9.

Since a distance between the inlet side center point C41 and the depth reference point P0 is ¼ of the maximum value W of the inlet side bore diameter, an acute angle formed by the line segment 7 and the center line 9 is 60 degrees. The line segment collection surface 8 is a conical surface having an inclination angle of 60 degrees with respect to the center line 9.

The bottom surface 44 of the hole 4 is a plane parallel to the specific reference plane 6. The bottom surface 44 is orthogonal to the depth direction, and is positioned on a deeper side than the depth reference point P0. The side surface 43 of the hole 4 is positioned about the center line 9 on a radially outer side than an outer periphery of the bottom surface 44. Therefore, the portion among the inner surface 42 of the hole 4, which is located on the bottom side with respect to the specific reference plane 6, is positioned on a deeper side than the line segment collection surface 8.

The plastic molded product of the first embodiment has the following effects.

The hole 4 is circular as viewed in the depth direction of the inlet 41. The depth reference point P0 is spaced away with respect to the specific reference plane 6 by ¼ of the maximum value W of the inlet side bore diameter on the specific reference plane 6. Therefore, acute angles formed by two line segments 7, 7, which are respectively directed from the points constituting the circumference of the inlet 41 to the depth reference point P0, and the center line 9 are 60 degrees. Therefore, in the case of the hole 4 described above, the line segment collection surface is a conical surface having an inclination angle of 60 degrees.

The portion among the inner surface of the hole 4, which is located on the bottom side with respect to the specific reference plane 6, is all portions of the hole 4 excluding the inlet 41, and all of the portion is positioned on a deeper side in the depth direction than the line segment collection surface 8. For this reason, when light is incident in the hole 4 at an inclination angle of 60 degrees with respect to the center line 9, a position where the light reaches the bottom surface 44 is not the center of the bottom surface 44, and is offset from the center of the bottom surface 44 to an opposite side of an incident side of the light. Accordingly, specularly reflected light reaches the side surface 43 of the hole 4. Light coming out from the hole 4 is thus in a so-called diffuse reflection state. Therefore, specular glossiness of the plastic molded product of the present embodiment is reduced.

The plastic molded product of the present embodiment includes: the plurality of holes 4; and the surface body surface 5, which is a plane provided between the adjacent holes 4, 4 on the surface of the plastic body 1. Therefore, when an external force such as an impact force or a friction force is applied, the external force is dispersed and received by the surface body surface 5, thus the plastic molded product of the present embodiment is difficult to be broken or scraped as compared with a plastic molded product having conical protrusion tip ends, that is, a plastic molded product in which the external force is concentrated at one point. Therefore, durability of the plastic molded product of the present embodiment is improved.

The plastic molded product of the first embodiment of the present invention is manufactured by injection molding using a laser processed mold. More details are as follows.

The mold includes a pair of molds that form a cavity corresponding to a surface shape (outer shape) of the plastic molded product, that is, a fixed mold and a movable mold. In an example shown in the drawings, an upper mold, among the fixed mold and the movable mold facing each other in the up-down direction, is referred to as 11, and a lower mold is the fixed mold 12.

The movable mold 11 is configured with a movable mold body 11a. The movable mold body includes: a protrusion group 4G', configured by a plurality of protrusions 4' protruding on a surface that forms the cavity toward another surface, the protrusion group 4G' corresponding to the hole group 4G of the plastic molded product; and a surface body surface 5' formed on a surface of the movable mold body 11a, that is, at a position recessed with respect to the protrusion 4' between adjacent protrusions 4', 4'.

In the present embodiment, in the movable mold body 11a, the surface that forms the cavity is a plane, and the protrusion group 4G' protrudes downward on the plane (a lower surface in FIG. 1). All of the protrusions 4' are formed in a specific direction serving as a common height direction. In the present embodiment, a direction perpendicular to the lower surface, which is a plane, is defined as the common height direction with respect to all of the protrusions 4'.

A structure of the protrusion 4' corresponds to the structure of the hole 4. As conceptual elements that specifies the structure, the protrusion 4' includes: a specific reference plane 6' corresponding to the specific reference plane 6 in the hole 4; a height reference point P0' corresponding to the depth reference point P0 in the hole 4; line segments 7' corresponding to the line segments 7 of the hole 4; and a line segment collection surface 8' corresponding to the line segment collection surface 8 of the hole 4.

The specific reference plane 6' is perpendicular to the height direction, and is a plane on which points P41' on a most protruding side (tip end side) among all points on a circumference that constitutes a root 41' of the protrusion 4' are located. The specific reference plane 6' is formed for each protrusion 4'.

The height reference point P0' is spaced away from a center point C41' on a root side of the specific reference plane 6' toward a protruding side of the protrusion 4'. The height reference point P0' is spaced away by a distance equal to ¼ of a maximum value W' of a root side bore diameter on the specific reference plane 6'.

The line segments 7' are straight lines connecting the points on the circumference on the root side on the specific reference plane 6' and the height reference point P0'.

The line segment collection surface 8' is a surface formed by collecting all the line segments 7'.

As a conceptual element for facilitating understanding of the structure, the protrusion 4' includes a center line 9' corresponding to the center line 9 of the hole 4. The center line 9' is a straight line extending in the height direction and passing through the height reference point P0'.

In the present embodiment, the protrusion 4' has a circular truncated conical shape. Therefore, an outer surface 42' of the protrusion 4' corresponds to the circular truncated cone, which includes: a so-called tapered cylindrical side surface 43', in which a diameter of a circle decreases toward the tip end side; and a circular tip end surface 44' that closes a tip end side end of the side surface 43'.

In the movable mold 11, which is one mold of the mold, a portion among the outer surface 42' of the protrusion 4', which is located on the tip end side with respect to the specific reference plane 6', coincides with the line segment collection surface 8' or is positioned farther on the tip end side than the line segment collection surface 8'. In the present embodiment, the portion among the outer surface 42' of the protrusion 4', which is located on the tip end side with respect to the specific reference plane 6', is positioned farther on the tip end side than the line segment collection surface 8'.

When injection molding is performed using the mold described above, the plastic molded product of the first embodiment is molded. When the protrusion is formed with respect to the mold, laser processing is used, and the laser processing is performed in the following procedure.

FIGS. 2(a) to 2(d) are illustrative views showing processing procedures for forming the protrusion 4' in a mold 14. Each view shows a relationship between a laser head 13 and a processed surface of the mold. Views on a left side are seen from front facing the processed surface, and views on a right side are seen from a side of the processed surface.

1) As shown in FIG. 2(a), the mold 14 is placed on a processing table (not shown) below the laser head 13.

2) As shown in FIG. 2(b), the laser head 13 is moved relatively horizontally in a vertical direction and a horizontal direction with respect to the mold 14, laser is irradiated, and portions other than portions to be processed as the protrusions 4' are recessed by a predetermined depth. A hatched portion in the figure is a portion having been irradiated by laser.

3) As shown in FIG. 2(c), the laser head 13 is lowered by a predetermined dimension, then as in 2), the laser head 13 is moved relatively horizontally in the vertical direction and the horizontal direction with respect to the mold 14, laser is irradiated, and the portions other than the portions to be processed as the protrusions 4' are recessed by the predetermined depth.

Figure 3:
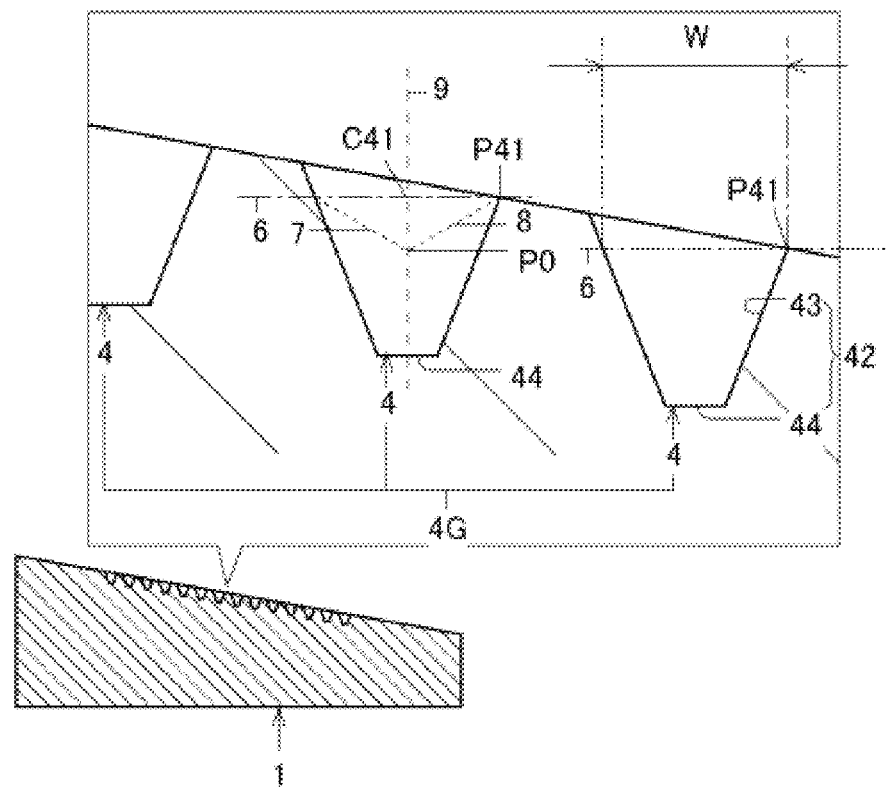
FIG. 3 is an illustrative view showing a plastic molded product according to a second embodiment of the present invention.

4) As shown in FIG. 2(d), 3) is repeated, and the protrusions 4' are formed on the surface of the mold 14.

The laser processing may be performed after a rough shape of the protrusion is formed by electric discharge processing on the surface of the mold. More specifically, as for processing performed on the surface of the mold, after the electric discharge processing is performed, 1) laser processing may be performed as the next processing, 2) sandblast processing and laser processing may be sequentially performed as the next processing, and 3) polishing processing and laser processing may be sequentially performed as the next processing.

As shown in FIG. 3, in a plastic molded product according to a second embodiment of the present invention, two thickness direction surfaces that constitute the surface of the plastic body 1 are planes which are not parallel to each other, the hole group 4G is formed on one of the two planes (an upper surface in FIG. 2), and a direction inclined with respect to one surface is the common depth direction with respect to all the holes 4.

In this case, the inner surface of the hole 4 includes the side surface 43 and the bottom surface 44, as in the first embodiment. All the bottom surfaces 44 of the hole group 4G are parallel to each other, and a direction perpendicular to the bottom surface 44 is the common depth direction.

Also in the present embodiment, the hole 4 includes the specific reference plane 6, the depth reference point P0, the line segments 7, and the line segment collection surface 8, which serve as conceptual elements that specifies the structure. As a conceptual element for facilitating understanding of the structure, the hole 4 includes the center line 9. Also in the present embodiment, the portion of the hole 4, which is located on the bottom side with respect to the specific reference plane 6, among the inner surface 42 of the hole 4, is positioned on a deeper side than the line segment collection surface 8. More details are as follows.

Since the hole 4 is formed with the direction inclined with respect to the plane serving as the depth direction, the points on the circumference that constitutes the inlet 41 of the hole 4 is arranged on a plane having depth difference. In this case, only one point on the circumference that constitutes the inlet 41 is the deepmost point P41 among the points. Therefore, the plane in the region 3 having small specular glossiness is not perpendicular to the depth direction, and is not the specific reference plane 6. The specific reference plane 6 is a plane perpendicular to the depth direction, on which the deepmost point P41 among all points on the circumference that constitutes the inlet 41 is located.

Space having a shape similar to a circular truncated cone is formed on the inner side of the hole 4. The shape similar to the circular truncated cone is as follows. It is assumed that a cone is cut at two positions at intervals in a direction in which a center line of the cone is extended (depth direction). One cut surface is located on a tip portion side of the cone, which is a plane orthogonal to the center line 9 and corresponds to the bottom surface 44 of the hole 4. The other cut surface is located on a circular surface side of an outer surface of the cone, which is farther on the tip portion side than the circular surface. The other cut surface is a plane inclined with respect to the center line 9, and an outer periphery of the plane is configured by all the points on the circumference that constitutes the inlet side of the hole 4. Therefore, the inlet 41 of the hole 4 is not circular. However, since the space formed on the inner side of the hole 4 is similar to a circular truncated cone, a shape of the inlet side on the specific reference plane 6 is circular. Since the inlet side of the hole 4 has a circular shape, the inlet side center point C41 is a center of the circle. As for the inlet side bore diameter, the maximum value W of the inlet side bore diameter is a diameter of the circle. A point, which is spaced away by a distance of ¼ with respect to the maximum value W of the inlet side bore diameter from the inlet side center point C41, is the depth reference point P0.

Since a distance between the inlet side center point C41 and the depth reference point P0 is ¼ of the maximum value W of the inlet side bore diameter, an acute angle formed by the line segment 7 and the center line 9 is 60 degrees. The line segment collection surface 8 is a conical surface having an inclination angle of 60 degrees with respect to the center line 9.

The bottom surface 44 of the hole 4 is a plane parallel to the specific reference plane 6, and is orthogonal to the depth direction. Since the bottom surface 44 of the hole 4 is located on the deeper side than the depth reference point P0, and the side surface 43 of the hole 4 is positioned on the radially outer side than the outer periphery of the bottom surface 44, the portion of the hole 4, which is located on the bottom side with respect to the specific reference plane 6, among the inner surface 42 of the hole 4, is positioned on the deeper side than the line segment collection surface 8. The portion among the inner surface 42 of the hole 4 on the inlet side with respect to the specific reference plane 6 is located on an outer side than a space perpendicular to the depth direction with respect to the line segment collection surface 8.

Although in the plastic molded products of the two embodiments described above the line segment collection surface 8 is easily formed from the plastic body 1 or the hole 4, there are cases in which the line segment collection surface 8 is difficult to be formed in a plastic molded product. More specifically, as an example of a plastic molded product in which the line segment collection surface 8 is difficult to be formed, it is assumed that there are cases in which the holes 4 have a high density, thus the region 3 which has small specular glossiness has no distinct surface body surface 5, or cases in which the inner surface of the hole 4 is formed by a curved surface, the inlet of the hole 4 is indistinct, or the inner surface 42 of the hole 4 has no distinct side surface 43 or bottom surface 44.

Figure 4:
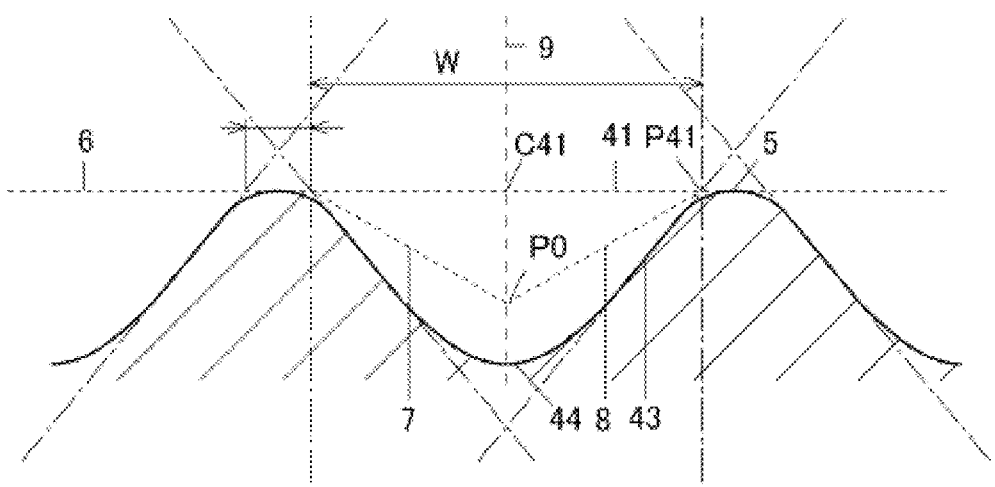
FIG. 4 is an illustrative view showing a plastic molded product according to a third embodiment of the present invention.

A plastic molded product of a third embodiment of the present invention is shown in FIG. 4, which is a case in which the line segment collection surface 8 is difficult to be formed. It should be noted that FIG. 4 only shows a cut surface when the plastic body 1 is cut.

When the surface body surface 5 and the bottom surface 44 are planes as in the first and second embodiments, the direction perpendicular to the plane may be the depth direction. However, when the surface body surface 5 and the bottom surface 44 are not planes, the direction perpendicular to the plane (depth direction) cannot be determined. When a bottom surface of an inner surface shape of the hole 4 is a portion of a spherical surface as shown in FIG. 4, the depth direction is determined as follows.

A shape of the portion of the spherical surface is an outer shape of an object when a sphere is cut in a plane such that the sphere becomes smaller than a hemisphere. An outer surface of the object is the bottom surface 44, and a direction, in which a center of the bottom surface 44 (the outer surface of the object) and a center of the sphere of the object which is the portion of the sphere are connected by a straight line, is the depth direction and the center line 9. When the bottom surface 44 has a shape of the portion of the spherical surface, one deepmost point on the spherical surface is a bottom portion, which is a deepmost portion among the inner surface 42 of the hole 4.

In the first and second embodiments, the inner surface shape of the hole 4 are distinct shapes, such as circular truncated cone or cylinder, so that in a case where the surface body surface 5 and the inner surface of the hole 4 intersect distinctly in a cross section, the inlet 41 of the hole 4 can be distinctly determined if the depth direction is known. As shown in FIG. 4, the inlet 41 of the hole 4 cannot be distinctly determined when the surface body surface 5 and the inner surface of the hole 4 are smoothly continuous (in an arc shape) in the cross section. As a result, the maximum value W of the inlet side bore diameter of the hole 4, the specific reference plane 6 of the hole 4, the line segments 7, and the line segment collection surface 8 cannot be distinctly determined.

In this case, the inlet is firstly determined according to the following order.

1) In a case where the inner space of the hole 4 is substantially a truncated cone (for example, a substantially circular truncated cone), that is, a case where there is a portion which is distinctly inclined at a predetermined angle in a tapered shape, and it can be determined that the side surface 43 is formed at the predetermined angle, an extension line having the predetermined angle is drawn along the side surface 43, and a location where the extension line intersects the specific reference plane 6 is a point that constitutes the inlet 41.

2) In a case where the inner space of the hole 4 is substantially a column (for example, a substantially cylinder or polygonal prism), that is, a case where there is a portion which is distinctly parallel to the depth direction on the side surface 43, and it can be determined that the side surface 43 is parallel to the depth direction, an extension line is drawn in the depth direction along the side surface 43, and a location where the extension line intersects the specific reference plane 6 is a point that constitutes the inlet 41.

When the inlet 41 is determined by the above 1) and 2), the deepmost point P41 on the inlet side, the maximum value W of the bore diameter of the inlet 41, the center point C41 of the inlet, the depth reference point P0, the line segments 7, and the line segment collection surface 8 are determined.

Figure 5:
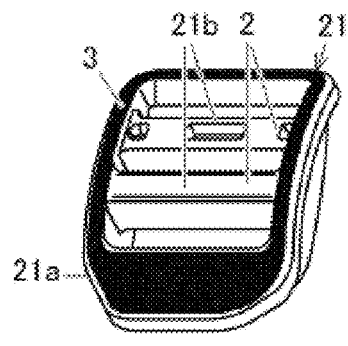
FIGS. 5(a) to 5(f) are perspective views showing specific examples of plastic molded products.
Figure 5:
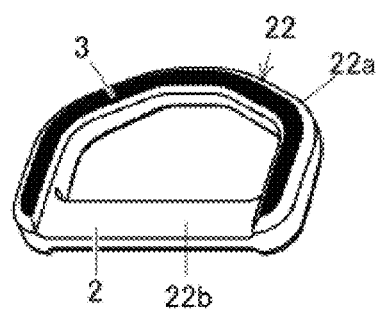
Figure 5:
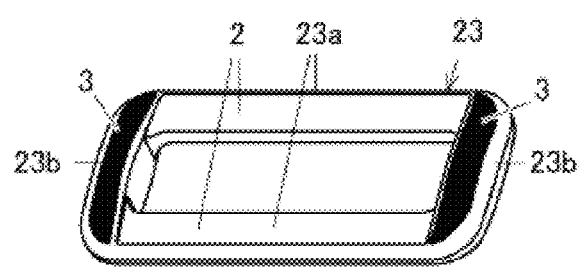
Figure 5:
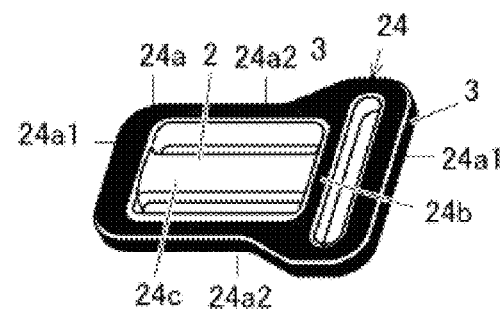
Figure 5:
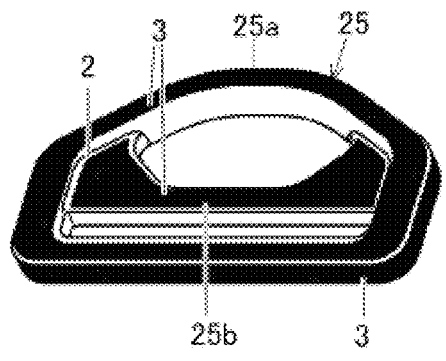
Figure 5:
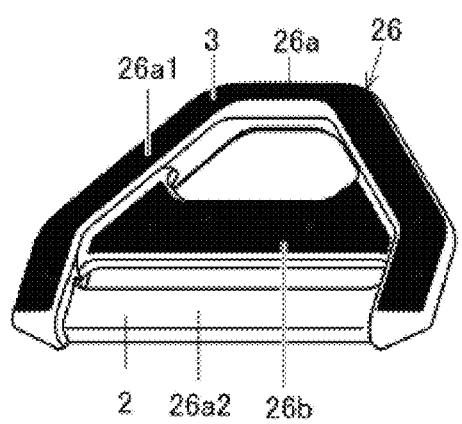

Specific examples of the plastic molded product include belt adjusters for adjusting a length of a belt, and couplers connected to a belt, as shown in FIGS. 5(*a*) to 5(*f*).

A belt adjuster 21 shown in FIG. 5(*a*) includes: a substantially rectangular frame 21*a*; and two parallel crosspieces 21*b*, 21*b* bridged inside the frame 21*a*. A upper surface of the frame 21*a* is a curved surface that is curved in an arc shape when viewed from an extending direction of the crosspiece 21*b*, and the region 3 having small specular glossiness, that is, the region including the hole group, is formed on the upper surface. The region 2 having large specular glossiness is formed on upper surfaces of the two crosspieces 21*b*, 21*b*.

The coupler 22 of FIG. 5(*b*) has a letter-D shape. Therefore, the buckle 22 includes: a curved piece 22*a* that is curved in an arc shape in the shape of the letter D; and a straight linear piece 22*b* that connects two end portions of the curved piece 22*a* in a straight line shape. The region 3 having small specular glossiness is formed on an upper surface of the curved piece 22*a*, and the region 2 having large specular glossiness is formed on an upper surface of the straight linear piece 22*b*.

A coupler 23 of FIG. 5(*c*) has a rectangular shape which is longer in the horizontal direction. Therefore, the buckle 23 includes: two parallel horizontal pieces 23*a*, 23*a*; and two parallel vertical pieces 23*b*, 23*b* that connect two end portions of the two horizontal pieces 23*a*, 23*a* and are shorter than the horizontal pieces 23*a*, 23*a*. The region 3 having small specular glossiness is formed on upper surfaces of the two vertical pieces 23*b*, 23*b*, and the region 2 having large specular glossiness is formed on upper surfaces of the two horizontal pieces 23*a*, 23*a*.

A belt adjuster 24 shown in FIG. 5(*d*) includes: an outer frame 24*a* extending mainly in the vertical and horizontal direction; a vertical crosspiece 24*b* bridged vertically inside the outer frame 24*a*; and a horizontal crosspiece 24*c* bridged between the vertical crosspiece 24*b* and the outer frame 24*a* in one of two spaces formed between the vertical crosspiece 24*b* and the outer frame 24*a*. The outer frame 24*a* includes: two parallel vertical pieces 24*a*1, 24*a*1 having different lengths; and two symmetrical horizontal pieces 24*a*2, 24*a*2 that extend in the horizontal direction and are bent in the vertical direction at horizontal direction intermediate portions thereof. The region 3 having small specular glossiness is formed on an upper surface and side surfaces of the outer frame 24*a* and an upper surface of the vertical crosspiece 24*b*, and the region 2 having large specular glossiness is formed on an upper surface of the horizontal crosspiece 24*c*.

The coupler 25 of FIG. 5(*e*) includes: a D-shaped outer frame 25*a*; and a crosspiece 25*b* bridged inside the outer frame 25*a*. The region 3 having small specular glossiness is formed on an upper surface and side surfaces of the outer frame 25*a* and most portions of an upper surface of the crosspiece 25*b*, and the region 2 having large specular glossiness is formed on an edge portion, which is a portion of the upper surface of the crosspiece 25*b*.

The coupler 26 of FIG. 5(*f*) has substantially the same shape as the buckle in FIG. 5(*e*), which includes: a D-shaped outer frame 26*a*; and the crosspiece 26*b* bridged inside the outer frame 26*a*. However, the D-shaped outer frame 26*a* includes: a curved piece 26*a*1 which is curved in an arc shape; and a straight linear piece 26*a*2 connecting two end portions of the curved piece 26*a*1 in a straight line shape, an upper surface thereof being lower than an upper surface of the curved piece 26*a*1. The region 3 having small specular glossiness is formed on upper surfaces of the curved piece 26*a*1 of the outer frame 26*a* and the crosspiece 26*b*, and the region 2 having large specular glossiness is formed on an upper surface of the straight linear piece 26*a*2 of the outer frame.

Figure 6:
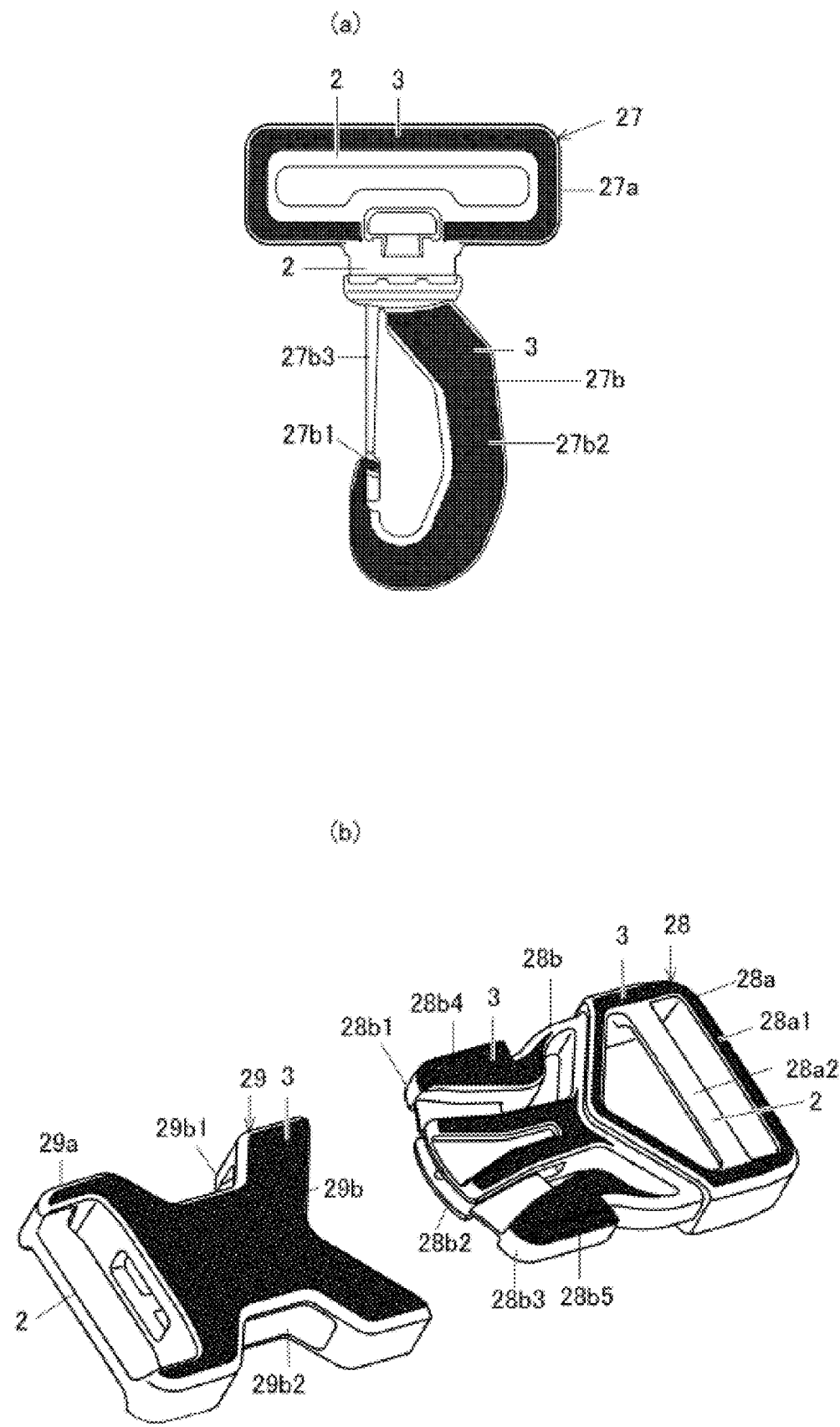
FIGS. 6(a) and 6(b) are a front view and a perspective view showing specific examples of plastic molded products.

As another specific example of the plastic molded product, as shown in FIG. 6(*a*), there is a coupler 27 (a so-called swivel hook) in which a portion of a hook portion is opened and closed by a spring. The swivel hook 27 includes: an annular portion 27*a* through which a belt passes; and a hook portion 27*b* through which another object passes, the hook portion 27*b* being opened and closed by a spring (not shown).

The hook portion 27*b* includes: a hook portion body 27*b*2, which has an annular shape having a portion thereof removed, that is, the hook portion body 27*b*2 includes an opening portion 27*b*1 between two length direction end portions, the hook portion body 27*b*2 being connected to a portion through which a belt passes; an operating portion 27*b*3 which is supported by the hook portion body 27*b*2 and is capable of opening and closing the opening portion 27*b*1; and a spring (not shown) that presses the operating portion 27*b*3 in a closing direction with respect to the hook portion body 27*b*2.

The region 3 having small specular glossiness is formed on an outer peripheral portion of the annular portion 27*a* and most of an upper surface of the hook portion body 27*b*2, and the region 2 having large specular glossiness is formed on an inner peripheral portion of the annular portion 27*a* and an upper surface of a portion of the hook portion body 27*b*2 which is connected to the annular portion.

As another specific example of the plastic molded product, as shown in FIG. 6(*b*), there is a buckle constituted by a pair of plugs 28 and a socket 29 which can be connected and disconnected.

The plug 28 includes: a portion 28*a*, through which a belt pass; and a male portion 28*b*, which can be connected and disconnected with respect to the socket 29.

In the illustrated example, the portion 28*a* through which the belt passes includes: an outer frame 28*a*1; and a crosspiece 28*a*2 bridged inside the outer frame 28*a*1.

In the illustrated example, the male portion 28*b* includes: three long slender male members 28*b*1, 28*b*2, and 28*b*3, which are provided in an approximately parallel manner and spaced apart from the portion 28*a* through which the belt passes. Two outer male members 28*b*1 and 28*b*3 among the three members are elastically deformable so as to narrow intervals between each other, by elasticity of plastic, toward an inner side. The two outer male members 28*b*1 and 28*b*3 include protruding portions 28*b*4 and 28*b*5 protruding outward in a direction separating from each other, respectively.

As for the plug 28, the region 3 having small specular glossiness is formed on the outer frame 28*a*1 of the portion 28*a* through which the belt passes, and most of upper surfaces of the three male members 28*b*1, 28*b*2 and 28*b*3 of the male portion 28*b*, and the region 2 having large specular glossiness is formed on a portion of upper surfaces of the two outer male members 28*b*1 and 28*b*3.

The socket 29 includes: a portion 29*a* through which the belt passes; and a cylindrical accommodating portion 29*b* that accommodates the male portion 28*b* such that the male portion 28*b* can be inserted and removed.

The portion 29*a* through which the belt passes is rectangular.

The accommodating portion 29b includes, on facing side surfaces of a tubular shape, fitting holes 29b1 and 29b2, each formed with a through hole that allows the protruding portions 28b4 and 28b5 to be inserted and removed.

As for the socket 29, the region 3 having small specular glossiness is formed on upper surfaces of three sides of a rectangular shape of the portion 29a through which the belt passes, and the region 2 having large specular glossiness is formed on the crosspiece 28a2 of the plug 28 and an upper surface of one side of the rectangular shape of the portion 29a of the socket 29 through which the belt passes.

Figure 7:
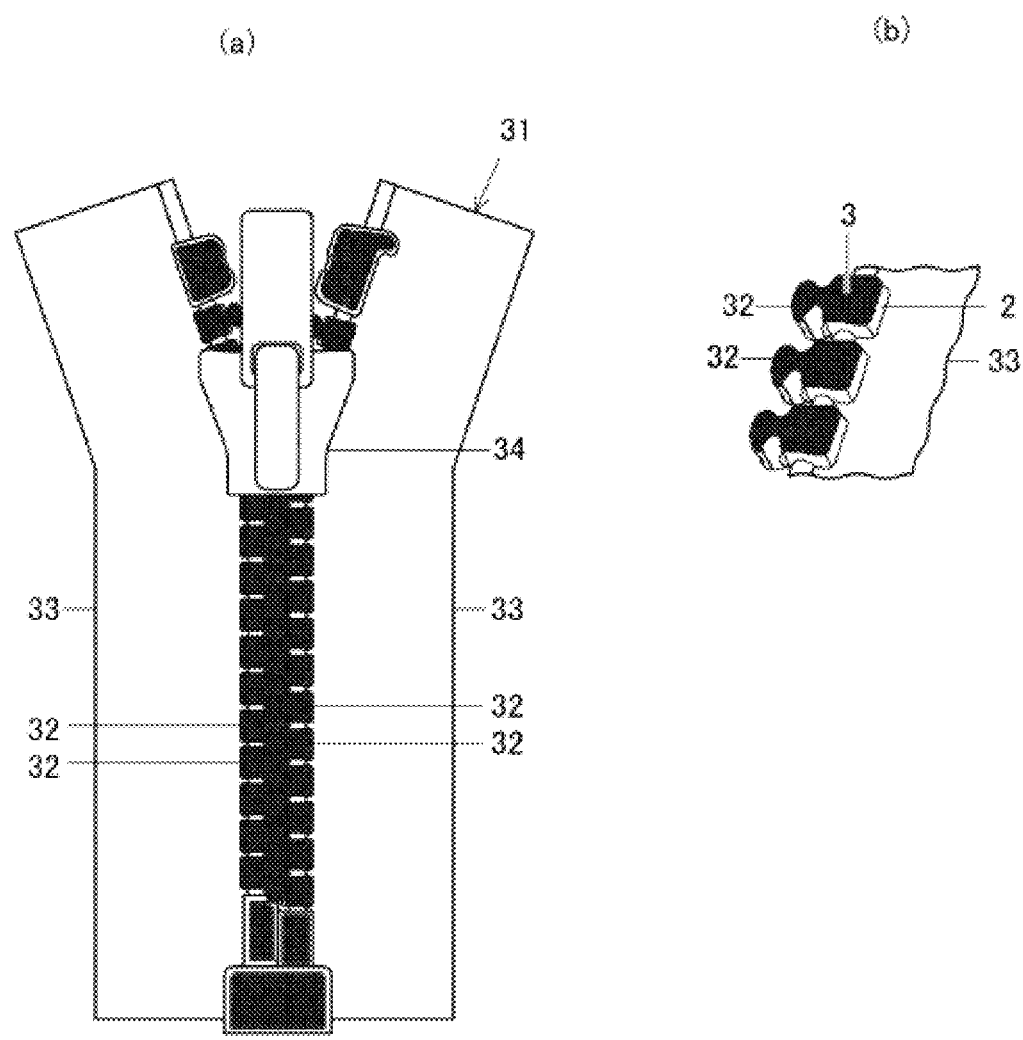
FIGS. 7(a) and 7(b) are a use state view showing a specific example of a plastic molded product and an enlarged perspective view of a portion of the plastic molded product in the use state.

As another specific example of the plastic molded product, as shown in FIGS. 7(a) and 7(b), there is an element 32 of a slide fastener 31.

The slide fastener 31 includes: a pair of tapes 33, 33; a large number of elements 32, 32, fixed along opposite side edge portions of the pair of tapes 33, 33; and a slider 34 that engages and separates two elements 32, 32 of the pair of tapes 33, 33.

The region 3 having small specular glossiness is formed on at least one surface (an upper surface in the figure) among surfaces of the element 32 that faces a thickness direction of the tape 33, and the region 2 having large specular glossiness is formed on surfaces other than the above-described surface.

The surface of the element 32 that faces the thickness direction of the tape 33 is in contact with the slider 34 and generates frictional resistance when the slider 34 slides. Therefore, as in this example, a sliding resistance of the slider 34 can be reduced by forming the region 3 having small specular glossiness on the surface of the element 32 that faces the thickness direction of the tape 33.

The present inventors prepared sample products to examine correlation between the structure of the hole and the specular glossiness, and the specular glossiness is measured. Results thereof are shown in Table 1.

Surfaces of plastic bodies of all the sample products were planes, and all holes in a hole group formed in one sample product had the same structure. A depth direction of the hole was a direction perpendicular to the plane.

Figure 8:
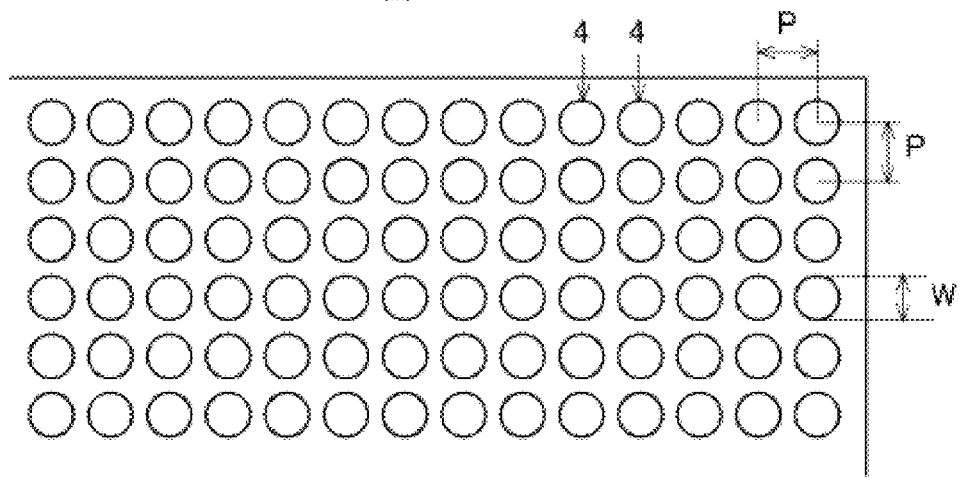
FIGS. 8(a) and 8(b) are illustrative views showing arrangement of holes.
Figure 8:
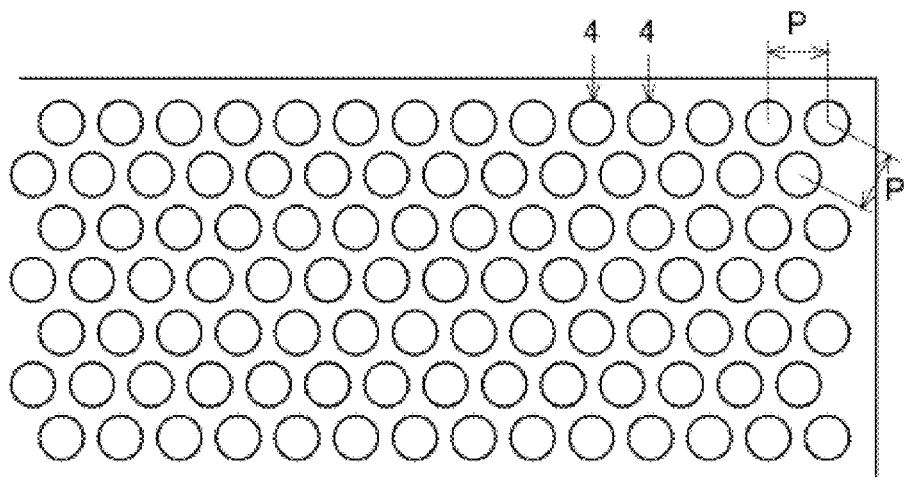
Figure 9:
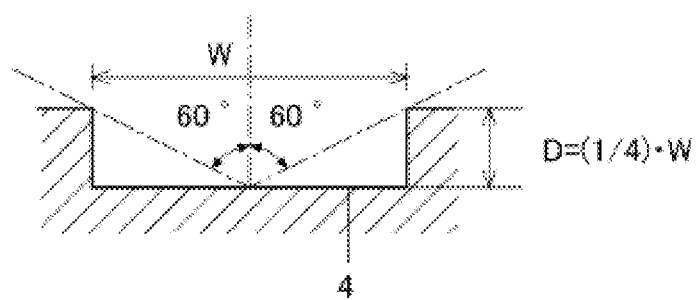
FIGS. 9(a), 9(b), and 9(c), collectively referred to as FIG. 9 are illustrative views showing a process for achieving the present invention.
Figure 9:
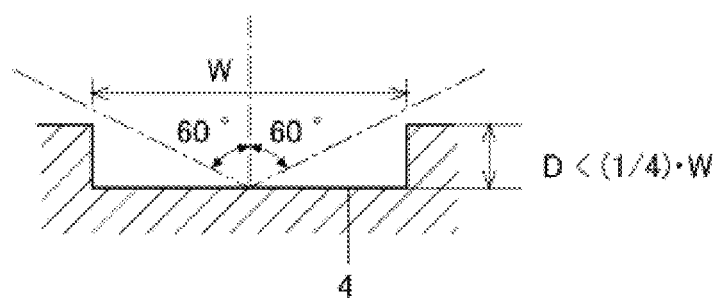
Figure 9:
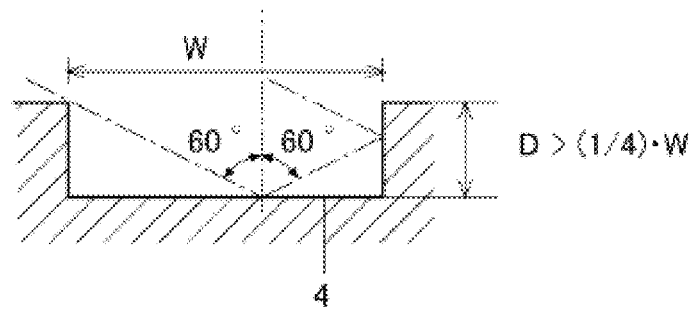
Figure 10:
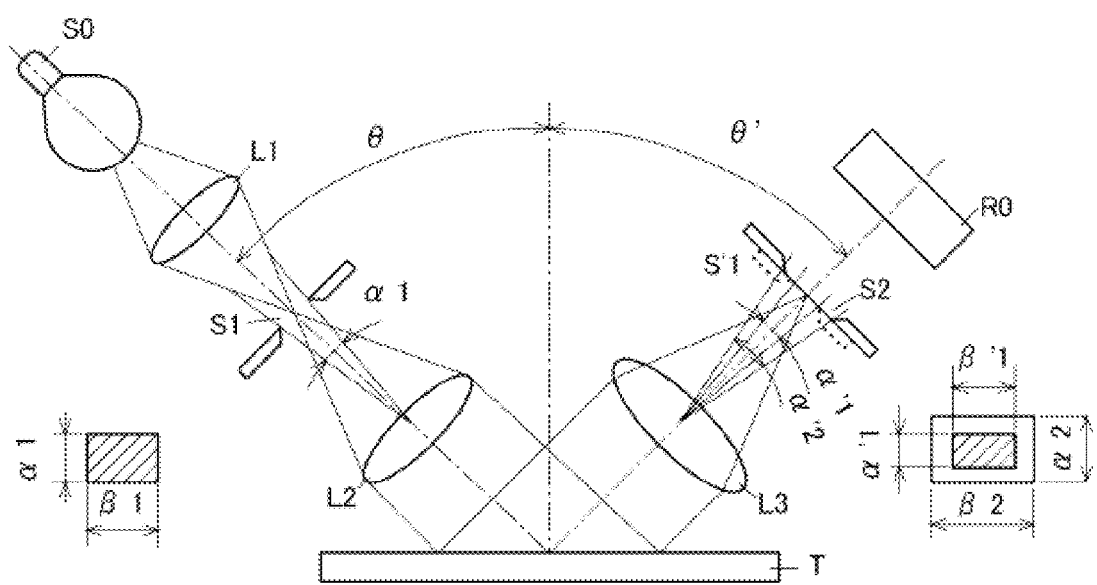
FIG. 10 is an illustrative view showing a concept of a specular glossiness measuring instrument.

As shown in FIG. 8, a pitch P refers to a distance between centers of adjacent holes 4, 4. Arrangement refers to a way of arranging the holes. Specifically, an example of the arrangement is shown in FIG. 8(a), the arrangement is based on the holes 4 arranged at four points of a square, and more specifically, the holes 4 are arranged in a matrix at equal pitches in vertical and horizontal directions, which is referred to as a square matrix for convenience.

As another example of the arrangement, as shown in FIG. 8(b), the holes 4 are arranged at three points of an equilateral triangle, and more specifically, the holes 4 are arranged at equal pitches in the horizontal direction and in 60-degree diagonal directions, which is referred to as a triangular matrix for convenience.

The sample products A-1 to A-3 were used to examine correlation between the depth of the hole and the specular glossiness, the shape was set to a cylinder, a diameter was set to 0.20 mm, as the bore diameter, and the pitch was set to 0.30 mm. There were three depths including 0.05, 0.10, and 0.15 mm. As the hole became deeper, the specular glossiness decreased.

The sample products C-1 and C-3 were used to examine correlation between an inner surface shape among the shape of the hole and the specular glossiness, the depth was set to 0.10 mm and the pitch was set to 0.30 mm. There were two inner surface shapes including a quadrangular prism (regular quadrangular prism) and a quadrangular pyramid (a regular quadrangular pyramid). In each of the quadrangular prism and the quadrangular pyramid, a length of a diagonal line of an inlet was 0.25 mm, and a length of a diagonal line of the quadrangular pyramid was 0.11 mm. As an area of a bottom surface became narrower, the specular glossiness increased.

TABLE 1

Plastic molded product (PITCH, BORE DIAMETER, DEPTH, ARRANGEMENT unit: mm (design value))

| | Shape of hole | Arrangement of hole | Pitch | Bore diameter of hole | One side | Diameter of bottom surface | Depth of hole | Ratio of depth to bore diameter | Specular glossiness |
|---|---|---|---|---|---|---|---|---|---|
| A-1 | Cylinder | Square matrix | 0.30 | Diameter 0.2 | | | 0.05 | 1/4 | 3.6 |
| A-2 | Cylinder | Square matrix | 0.30 | Diameter 0.2 | | | 0.10 | 2/4 | 1.2 |
| A-3 | Cylinder | Square matrix | 0.30 | Diameter 0.2 | | | 0.15 | 3/4 | 0.3 |
| B-1 | Cylinder | Square matrix | 0.25 | Diameter 0.2 | | | 0.10 | 2/4 | 0.3 |
| B-2 | Cylinder | Square matrix | 0.35 | Diameter 0.2 | | | 0.10 | 2/4 | 1.8 |
| B-3 | Cylinder | Square matrix | 0.30 | Diameter 0.15 | | | 0.10 | 2.66/4 | 4.6 |
| C-1 | Quadrangular Prism | Square matrix | 0.30 | Diagonal 0.25 | 0.177 | | 0.10 | 1.6/4 | 0.6 |
| C-2 | Quadrangular Prism | Square matrix | 0.30 | Diagonal 0.28 | 0.2 | | 0.10 | 1.44/4 | 0.3 |
| C-3 | Quadrangular Pyramid | Square matrix | 0.30 | Diagonal 0.25 | 0.177 | 0.077 | 0.10 | 1.6/4 | 3.7 |
| D-1 | Cylinder | Triangular matrix | 0.212 | Diameter 0.2 | | | 0.10 | 2/4 | 0.3 |

There are 10 sample products including A-1 to A-3, B-1 to B-3, C-1 to C-3, and D-1. Elements that specify the structure of the holes include shape, bore diameter, depth, pitch, and arrangement. These elements of the sample products are differentiated. Dimensions of the holes are values based on dimensions of protrusions of molds corresponding to the holes, and are design values obtained when the protrusions of the molds are formed. Values of the protrusions and values of the holes are substantially the same. In the following description, a bore diameter of the sample product refers to a maximum value of the bore diameter.

Therefore, regardless of whether an inlet side of the inner surface shape is circular or quadrangular, the specular glossiness increased as the bore diameter decreases toward a bottom side.

The sample products B-1, A-2 and B-2 were used to examine correlation between the pitch of the hole and the specular glossiness, the shape was set to a cylinder, the diameter was set to 0.20 mm, and the depth was set to 0.10 mm. There were three pitches including 0.25, 0.30, and 0.35 mm. As the pitch became wider, the specular glossiness increased.

The sample products B-3 and A-2 were used to examine correlation between the bore diameter and the specular glossiness, the shape was set to a cylinder, the depth was set to 0.10 mm, and the pitch was set to 0.30 mm. As the bore diameter, there were two diameters including 0.15 and 0.20 mm. As the diameter became larger, the specular glossiness decreased.

The sample products C-1 and C-2 were also used to examine the correlation between the bore diameter and the specular glossiness, which is a case in which the shape of the hole is different from the shapes of the sample products B-3, A-2 and B-4. The shape of the hole was set to a quadrangular prism, the depth was set to 0.10 mm, and the pitch was set to 0.30 mm. As the bore diameter, there were two diagonal lengths including 0.25 and 0.28 mm. As the diameter became larger, the specular glossiness decreased. Therefore, the specular glossiness decreased as the diameter increases, regardless of the shape.

The sample products A-2 and C-1 were used to examine correlation between the shape of the hole and the specular glossiness, the depth was set to 0.10 mm and the pitch was set to 0.30 mm. There were two shapes of the holes including a cylinder and a quadrangular prism. Inlet areas of the holes are approximately the same, which are 0.0314 $mm^2$ and 0.0313 $mm^2$. As the bore diameters of the holes, a diameter is 0.2, a diagonal length is 0.25 mm (an average value of about 0.2 mm), which are approximately the same. Therefore, the specular glossiness changed depending on the shape of the hole.

The sample products A-2 and D-1 were used to examine correlation between the arrangement of the holes and the specular glossiness, A-2 is a square matrix, and D-1 is a triangular matrix. More specifically, A-2 is formed by arranging the holes in a matrix at equal pitches of 0.3 mm in the vertical and horizontal directions. D-1 is formed by arranging the holes at equal pitches of 0.212 mm in the horizontal direction and 60-degree diagonal directions. The depth was set to 0.10 mm, and the shape of the hole was set to a cylinder. Since D-1 is a triangular matrix, it is easier to set the pitch thereof to be smaller than A-2, and an area of the surface body surface 5 can be reduced. As a result, the specular glossiness decreased.

It should be noted that the inlets of the holes are positioned on the specific reference plane 6 in all the sample products. A ratio of the depth to the bore diameter of the hole is set to be ¼ or more. More specifically, a portion other than the inlet of the inner surface 42 is positioned on the bottom side with respect to the specific reference plane 6, only a portion of the inner surface 42 of the hole coincides with the line segment collection surface 8, and the entire inner surface 42 is located on the deeper side than the line segment collection surface 8. A highest specular glossiness among all the sample products is 4.6, which is less than the specular glossiness of the plastic molded product produced by the present applicant in May 2017, which is 5.5 to 6.4. Therefore, when the portion of the inner surface 42 of the hole which is located on the bottom side with respect to the specific reference plane 6 coincides with the line segment collection surface 8 or is positioned on the deeper side than the line segment collection surface 8, the specular glossiness can be reduced.

In order to demonstrate this conclusion, the present inventors prepared other sample products, actually measured the dimensions of the holes, and measured the specular glossiness. Results thereof are shown in Table 2.

TABLE 2

Plastic molded product (pitch, bore diameter, depth, arrangement unit: mm (actually measured value))

| | Shape of hole | Arrangement of hole | Pitch | Bore diameter of hole | One side | Diameter of bottom surface | Depth of hole | Ratio of depth to bore diameter | Specular glossiness |
|---|---|---|---|---|---|---|---|---|---|
| A-5 | Circular Truncated Cone | Square matrix | 0.30 | Diameter 1.11 | | 0.71 | 0.29 | 1.05/4 | 1.1 |
| A-6 | Circular Truncated Cone | Square matrix | 0.30 | Diameter 0.86 | | 0.50 | 0.56 | 2.60/4 | 0.3 |
| A-7 | Circular Truncated Cone | Square matrix | 0.30 | Diameter 1.11 | | 0.91 | 0.30 | 1.08/4 | 1.3 |
| A-8 | Circular Truncated Cone | Square matrix | 0.30 | Diameter 1.20 | | 0.90 | 0.58 | 1.93/4 | 0.8 |

There are 4 sample products including A-5 to A-8. In these prototypes, the ratio of the depth to the bore diameter of the hole is set to be ¼ or more. A highest specular glossiness among the four sample products is 1.3, which is less than the specular glossiness of the plastic molded product produced by the present applicant in May 2017, which is 5.5 to 6.4. Therefore, it is confirmed that when the portion of the inner surface 42 of the hole which is located on the bottom side with respect to the specific reference plane 6 is positioned on the deeper side than the line segment collection surface 8, the specular glossiness can be reduced.

Considering the test results of the sample products and a manufacturing technique at the time of the present application, the structure of the hole is preferably as follows.

The maximum value W of the inlet side bore diameter is preferably 1.0 mm or less. Reasons therefor are as follows.

The larger the bore diameter of the hole 4, the more conspicuous the presence of the hole 4. As influence thereof on an appearance becomes larger, the hole 4 is recognized as a pattern. An ejector pin is used in injection molding for molding plastic, and a minimum diameter of the ejector pin is 1.0 mm in the manufacturing technique at the time of the present application. Therefore, if the maximum value W of the inlet side bore diameter is less than the diameter of the ejector pin, the presence of the hole is not conspicuous, that is, a good appearance can be achieved, and the specular glossiness of the plastic molded product can be reduced.

The injection molding manufacturing technique at the time of the present application has the following technical knowledge. In a case of POM, a minimum value of a thickness of a plastic molded product is about 0.8 to 0.9 mm in some portions (in thin plate portions) in consideration of rigidity. When a hole is formed in such a thin plate portion, a filling failure occurs easily.

In the case of the POM, when the minimum value of the thickness is 0.5 to 0.6 mm or less, the filling failure occurs.

Therefore, when the thickness of the thin plate portion is about 0.8 to 0.9 mm, a maximum value of a depth of the hole is 0.25 mm.

In a case of a nylon product, when the minimum value of the thickness is less than 0.7 mm, the filling failure occurs. Therefore, when the thickness of the thin plate portion is about 1.0 mm, the maximum value of the depth of the hole is 0.25 mm.

The present invention is not limited to the above-described embodiments or sample products, and modifications can be made without departing from the scope thereof

REFERENCE SIGNS LIST

1 Plastic body
2 Region having large specular glossiness
3 Region having small specular glossiness
4 Hole
4G Hole group
41 Inlet
42 Inner surface
43 Side surface
44 Bottom surface
4' Protrusion
4G' Protrusion group
41' Root
42' Outer surface
43' Side surface
44' Tip end surface
5, 5' Surface body surface
6, 6' Specific reference plane
7, 7' Line segment
8, 8' Line segment collection surface
9, 9' Center line
11 Movable mold
11a Movable mold body
12 Fixed mold
13 Laser head
14 Mold
21 Belt adjuster
21a Frame
22b Crosspiece
22 Coupler
22a Curved piece
22b Straight linear piece
23 Coupler
23a Horizontal piece
23b Vertical piece
24 Belt adjuster
24a Outer frame
24a1 Vertical piece
24a2 Horizontal piece
24b Vertical crosspiece
24c Horizontal crosspiece
25 Coupler
25a Outer frame
25b Crosspiece
26 Coupler
26a Outer frame
26a1 Curved piece
26a2 Straight linear piece
26b Crosspiece
27 Coupler (swivel hook)
27a Annular portion
27b Hook portion
27b1 Opening portion
27b2 Hook portion body
27b3 Operating portion
28 Plug
28a Portion through which belt pass
28a1 Outer frame
28a2 Crosspiece
28b Male portion
28b1, 28b2, 28b3 Male members
28b4, 28b5 Protruding portions
29 Socket
29a Portion through which belt pass
29b Accommodating portion
29b1, 29b2 Fitting holes
31 Slide fastener
32 Element
33 Tape
34 Slider
D Depth
W, W' Maximum values of bore diameters
P0 Depth reference point
P0' Height reference point
P41 Deepmost point on inlet side of hole
P41' Point on most protruding side of root side of protrusion
C41 Inlet side center point of hole
C41' Root side center point of protrusion

The invention claimed is:

1. A plastic molded product, comprising:
a plastic body provided with a plurality of holes, which are recessed in a common depth direction, on a surface of the plastic body, wherein
the holes include: an inner surface, which includes an inlet; a specific reference plane perpendicular to the depth direction, the specific reference plane including at least a portion of the inlet; and a depth reference point, which is spaced away from a center point on an inlet side of the specific reference plane toward a bottom side of the hole, the depth reference point being spaced away by a distance equal to ¼ of a maximum value of an inlet side bore diameter on the specific reference plane,
a diameter of the hole decreases toward the bottom side in the depth direction,
a bottom portion which is a deepmost portion of the inner surface of the hole is in a position which coincides with the depth reference point or is deeper than the depth reference point toward the bottom side,
the plastic molded product includes: a small specular glossiness region including the plurality of holes; and a large specular glossiness region not including any of the plurality of holes, and
the plastic molded product is any one of the following:
the plastic molded product being a belt adjuster including: a rectangular frame; and two parallel crosspieces bridged inside the frame, the small specular glossiness region being formed on an upper surface of the rectangular frame, and the large specular glossiness region being formed on upper surfaces of the two crosspieces;
the plastic molded product being a coupler including: a curved piece that is curved in an arc shape; and a straight linear piece that connects two end portions of the curved piece in a straight line shape, the small specular glossiness region being formed on an upper surface of the curved piece, and the large specular glossiness region being formed on an upper surface of the straight linear piece;
the plastic molded product being a rectangular coupler including: two parallel horizontal pieces; and two parallel vertical pieces that connect two end portions of the two horizontal pieces and are shorter than the horizontal pieces, the small specular glossiness region being formed on upper surfaces of the two vertical pieces, and the large specular glossiness region being formed on upper surfaces of the two horizontal pieces;

the plastic molded product being a belt adjuster including: an outer frame; a vertical crosspiece bridged vertically inside the outer frame; and a horizontal crosspiece bridged between the vertical crosspiece and the outer frame, the small specular glossiness region being formed on an upper surface and side surfaces of the outer frame and an upper surface of the vertical crosspiece, the large specular glossiness region being formed on an upper surface of the horizontal crosspiece;

the plastic molded product being a coupler include: a D-shaped outer frame; and a crosspiece bridged inside the outer frame, the small specular glossiness region being formed on an upper surface and side surfaces of the outer frame and a portion other than an edge portion of an upper surface of the crosspiece, the large specular glossiness region being formed on the edge portion which is a portion of the upper surface of the crosspiece;

the plastic molded product being a coupler including an outer frame including a curved piece which is curved in an arc shape and a straight linear piece connecting two end portions of the curved piece in a straight line shape; and a crosspiece bridged inside the outer frame, the small specular glossiness region being formed on upper surfaces of the curved piece and the crosspiece, the large specular glossiness region being formed on an upper surface of the straight linear piece;

the plastic molded product being a coupler including: an annular portion through which a belt passes; and a hook portion including a hook portion body with an opening portion and including an operating portion capable of opening and closing the opening portion, the small specular glossiness region being formed on upper surfaces of the annular portion and the hook portion body, and the large specular glossiness region being formed on an upper surface of a portion of the hook portion body which is connected to the annular portion;

the plastic molded product being a buckle constituted by a plug and a socket which can be connected and disconnected, the plug including: a portion through which a belt passes including an outer frame and a crosspiece bridged inside the outer frame; and a male portion which can be connected and disconnected with respect to the socket, the socket including: a portion though which the belt passes; and an accommodating portion that allows the male portion to be inserted and removed, the small specular glossiness region being formed on upper surfaces of the outer frame of the plug and the accommodating portion of the socket, and the large specular glossiness region being formed on upper surfaces of the crosspiece of the plug and one side of a rectangular shape of the portion through which the belt passes of the socket; and the plastic molded product being an element of a slide fastener, the small specular glossiness region being formed on at least one surface among surfaces of the element that faces a thickness direction, the surfaces that faces the thickness direction being an upper surface and a lower surface, the large specular glossiness region being formed on other surfaces.

2. The plastic molded product according to claim 1, wherein
the specific reference plane is a plane on which a deepmost point among points on a circumference that constitutes the inlet is located,
the holes include: all line segments connecting points of the circumference on the inlet side on the specific reference plane and the depth reference point; and a line segment collection surface defined by collecting all the line segments,
wherein a portion among the inner surface of the holes, which is located on the bottom side with respect to the specific reference plane, is in a position which coincides with the line segment collection surface or is deeper than the line segment collection surface toward the bottom side.

3. The plastic molded product according to claim 2, wherein
the portion among the inner surface of the holes, which is located on the bottom side with respect to the specific reference plane, is in a position which is deeper than the line segment collection surface toward the bottom side.

4. The plastic molded product according to claim 1, wherein
the maximum value of the inlet side bore diameter is equal to or less than 1.0 mm.

5. The plastic molded product according to claim 1, wherein
a shape of the inlet of the holes as viewed in the depth direction is rectangle, regular polygon, circle, or ellipse.

6. The plastic molded product according to claim 5, wherein
a region, in which the plurality of the holes are formed on the surface of the plastic body, is a plane, and the plane is the specific reference plane.

7. The plastic molded product according to claim 5, wherein
a region, in which the plurality of the holes are formed on the surface of the plastic body, is a curved surface.

* * * * *